United States Patent [19]
Leason et al.

[11] Patent Number: 5,898,594
[45] Date of Patent: Apr. 27, 1999

[54] METHOD AND APPARATUS FOR ENABLING A SELECTION OF CATALOG ITEMS

[76] Inventors: David Leason; Wendy Z. Leason, both of 176 E. 77th St., New York, N.Y. 10021

[21] Appl. No.: 08/669,589

[22] Filed: Jun. 24, 1996

[51] Int. Cl.⁶ .............................. G06F 17/00; G06G 7/48
[52] U.S. Cl. .............................. 364/479.01; 364/479.02; 364/479.03; 364/478.13; 364/478.14
[58] Field of Search ........................ 364/479.01, 479.02, 364/479.03, 474.07, 479.08, 479.12, 479.11, 478.13, 478.14; 705/26, 27; 395/226, 11, 50, 51; 707/10, 100, 104, 101

[56] References Cited

U.S. PATENT DOCUMENTS

| | | | |
|---|---|---|---|
| 4,931,932 | 6/1990 | Dalnekoff et al. | 364/407 |
| 4,959,686 | 9/1990 | Spallone et al. | 705/26 |
| 4,984,155 | 1/1991 | Geier et al. | 705/26 |
| 5,013,897 | 5/1991 | Harman et al. | 235/381 |
| 5,088,586 | 2/1992 | Isobe et al. | 194/205 |
| 5,095,195 | 3/1992 | Harman et al. | 235/381 |
| 5,319,542 | 6/1994 | King, Jr. et al. | 705/27 |
| 5,410,344 | 4/1995 | Graves et al. | 348/1 |
| 5,412,774 | 5/1995 | Agrawal et al. | 395/157 |
| 5,444,844 | 8/1995 | Inoue et al. | 705/27 |
| 5,451,998 | 9/1995 | Hamrick | 348/13 |
| 5,483,472 | 1/1996 | Overman | 364/705.06 |
| 5,528,490 | 6/1996 | Hill | 364/403 |
| 5,576,951 | 11/1996 | Lockwood | 705/27 |
| 5,583,539 | 12/1996 | Hiketa et al. | 345/146 |
| 5,592,477 | 1/1997 | Farris et al. | 370/396 |
| 5,600,827 | 2/1997 | Nakabayashi et al. | 395/602 |
| 5,638,457 | 6/1997 | Deaton et al. | 382/100 |
| 5,664,110 | 9/1997 | Green et al. | 705/26 |
| 5,666,493 | 9/1997 | Wojcik et al. | 705/26 |

OTHER PUBLICATIONS

J.C. Penny & Co. website, including "The Gift Registry" and sample registries.

Macy's Bridal website, including the "Wedding Line," and a sample registry.

"Online Bride," Newsday, Friday, Jun. 28, 1996, page (unknown).

Bridalnet website, including "World Wide Registry," "Registry Information," and "Barrons" pages.

Opuswedding website, including the "Home page," "Online Registry," and "Bridal Registries" pages.

TOYS–R–US® Registry Form including circular, salutation, and sheet of announcement cards.

Product Description: Rapid Rental Software from http://www.tvl.com/rapidren.html, including the "Rapid Rental Software," "Rapid Rental—Public Terminal Software," and "Title Select Software" pages.

Product Description: VIDSTAR Video Rental Program from http://www.mosquitonet.com/'north/vidstar.txt, including four chapter manual.

*Primary Examiner*—Reba I. Elmore
*Assistant Examiner*—Ramesh Patel

[57] ABSTRACT

A method and apparatus for enabling a selection of items at a computer terminal from an electronic catalog is described. One or more customers access the terminal and identify themselves, and each such customer's past item selections are made available to the system in the form of an electronic signal. A subset of catalog items is created which excludes the prior selections of each identified customer. Thus, if only one customer has identified himself or herself, then only that customer's prior selections are excluded from the catalog of items. And, if two or more customers have identified themselves, then the subset created will exclude the items of those customers' prior selections. The customer is enabled to select items at the terminal from at least the items in the subset. The subset may be distinguished from the remainder of the catalog items in a number of ways. The subset formed may optionally be directed to items of a specific category or type from within the catalog. The invention has industrial utility, for example, in the rental and sale of movies in the form of videotapes and the like and in the maintenance and managing of registry-based transactions.

34 Claims, 7 Drawing Sheets

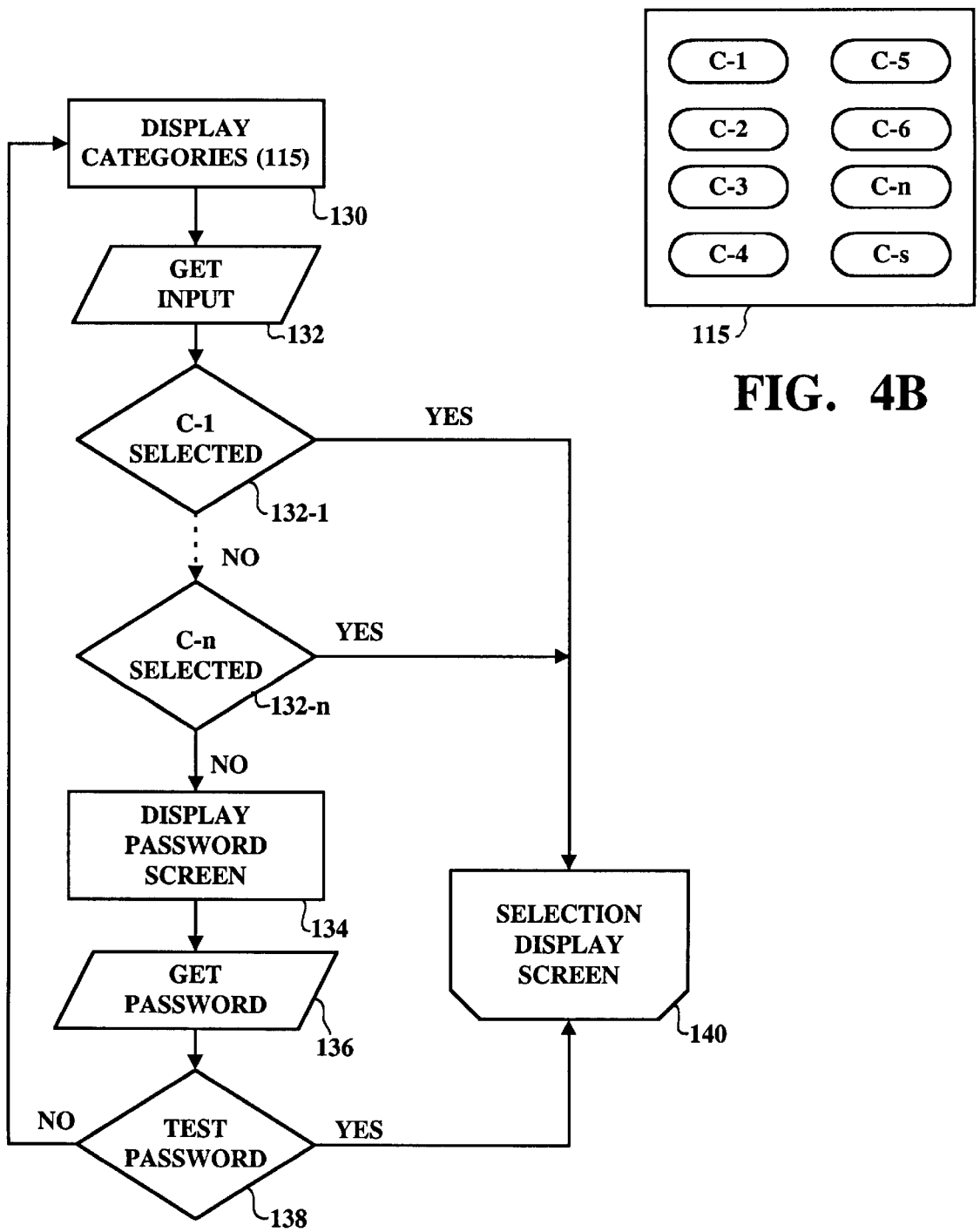

METHOD AND APPARATUS FOR ENABLING A SELECTION OF CATALOG ITEMS

FIELD OF THE INVENTION

The present invention relates to a method and apparatus for enabling a selection of items from an electronic catalog at a terminal.

BACKGROUND OF THE INVENTION

An industry has evolved in the United States and throughout the world in which consumers rent prerecorded videotapes for home viewing. The videotapes may contain a vast range of different types of program material including, for example, movies and instructional programming. While the videotape rental industry continues to flourish, the development of competing technologies suggests that the popularity of videotapes may diminish with the advent of superior program formats. Some technologies presently vying for consumer acceptance are real-time formats such as cablecast and satellite broadcasts, and prerecorded formats such as analog/digital video disks and optic/magneto-optic disks. The technology which will ultimately supplant the videotape as a preferred medium is difficult to predict. The advent of such technologies has heralded some skepticism as to the fate of videotapes; however, the popularity of renting videotapes has yet to subside.

In the videotape rental industry, it is generally desirable for videotape rental establishments to offer consumers a wide selection of videotapes to attract customers into a store. In addition, it is generally desirable to stock multiple copies of particular tapes, especially tapes that have recently been placed on the market (so-called "new releases"). In the conventional store where a videotape or its packaging is displayed on a shelf, these factors militate toward increased shelf space and, therefore, larger stores. This may be impracticable in certain geographic areas such as large cities where real estate space is precious. Further, the vastness of some stores may adversely affect a customer's ability to comprehend his or her selection options.

Another problem in the art is that each customer in his or her past experience likely will have seen certain videotape selections that are offered by a particular store, whereas another customer undoubtedly will have seen different selections. The divergent experiences of store customers makes it difficult for groups of customers (e.g., friends) to collectively select a videotape that neither (or none) of them has seen. In addition, some customers may inadvertently select and rent a videotape only to discover that they have already seen the videotape.

A further problem in the art of videotape rental establishments is that customers tend to "hold" tentative videotape selections as they shop in the retail store in a quest for a more preferred selection. Each tape held by a customer is a potential lost rental (or sale) to another customer. Further, the rental establishment does not enjoy any profit from a customer holding a videotape unless it is actually rented or sold.

As a solution to one or more of the foregoing problems, an object of the present invention is to provide an improved method for enabling a selection of items, such as videotapes, from a catalog.

Another object of the present invention, as a solution to one or more of the foregoing problems, is to provide an apparatus which enables a selection of items from a catalog.

Other objects of the invention include, but are not limited to, the following:

To provide a method in which each customer's past designations are known and affect his or her present enablement to select items from the catalog;

To provide a method in which each customer's designations are retrievable and effect the presentation and/or enablement of selection of items in the catalog;

To provide a method in which each customer can generate a shopping or "short" list of one or more preferred items from the catalog without selecting a particular item to be rented and without incurring any fee;

To provide a method in which a first customer can combine his or her "short" list generated at one terminal with the short list of a second customer;

To provide a method in which each customer can reserve for a predetermined fee one or more greatly preferred items of the available items in the catalog without committing to renting the greatly preferred item;

To provide a method in which each customer can shop and reserve one or more items from the catalog at a location which is remote from the retail establishment;

To provide an automated method in which persons can designate one or more items from a customer's registry;

To provide an apparatus which achieves any of the foregoing objects; and

To provide a marketing tool which encourages the rental, purchase, use, attendance, or trying of things or activities made available through an electronic catalog.

DEFINITIONS

As used herein, "catalog" refers to a list or group of items of related type. Examples within the definition of catalog include that which may be included on a list for selection, such as videos made available by a rental establishment, or restaurants, cinemas, or performances made available by an electronic guide. The inventory of items for sale is also a catalog when made available as an electronic list, and may include typical registry items such as toys, china, stemware, and flatware. As used herein, "items" refers to the elements listed in the catalog.

A "trailer" or "clip" may be a segment of a motion picture, for example, about five to about sixty seconds long, or may be a still image of an item from the catalog (e.g., cover art for a movie, a china pattern, or a baby toy). The trailer is accessed from a predetermined location within a storage device (e.g., jukebox or CD-ROM) using a "clip address."

SUMMARY OF THE INVENTION

According to one aspect of the invention, a method for enabling a selection of items from a catalog to a customer is disclosed in which catalog data representing items from a catalog are provided in the form of electronic signals at a computer terminal. One or more customers access the terminal and identify themselves (or someone else), and each identified customer's past item designations are made available to the system in the form of an electronic signal. The method creates a subset of catalog items which excludes the prior designations of each identified customer. Thus, if only one customer has identified himself or herself, then only that customer's prior designations are excluded from the catalog of items. And, if two or more customers have identified themselves, then the subset created will exclude the items of those customers' prior designations. The method then enables an item to be selected at the terminal from at least the items in the subset. The subset may be distinguished from the remainder of the catalog items in a number of ways.

The subset formed may optionally be directed to items of a specific category or type (e.g., genre) from within the catalog.

As applied to the renting of prerecorded program material such as videotapes, the method may be used to guide customers toward program material that they have not previously seen. As a further optional feature of the inventive method, a customer can reserve an item from the catalog for a set or variable amount of time without committing to renting or purchasing it. The customer may pay a premium for any such reservations. In addition, the quantity of each item from the catalog that is presently in stock and not reserved optionally may be monitored so that a customer is enabled to designate or reserve an item from the catalog only if there is a non-zero number of items in stock.

According to another aspect of the invention, a method for enabling a designation of items from a catalog is disclosed in which a catalog is made available at a station in a computer operated system as catalog data. At least a first customer is identified at the station from an input customer-identification signal. The method obtains catalog data which includes items associated with the identified customer. The method also obtains designation-data which represents the prior designations of items for each identified customer and which is associated with each identified customer. The method creates a database subset from the catalog data which excludes the designation-data. The method then enables an electronic designation of an item at the station from at least the items in the database subset. After a designation has been made, the designation-data associated with each identified customer is modified to include such item designation.

An apparatus that achieves the foregoing methods includes devices for implementing each of the above-described steps, and may be configured to implement the method on a local area or wide area network.

These and other features and advantages of the invention will be readily apparent from the following detailed description of certain preferred embodiments in conjunction with the drawings therefor.

BRIEF DESCRIPTION OF THE DRAWINGS

FIG. 4A illustrates a flow chart for displaying one or more categories of items in a catalog and related data in accordance with a preferred embodiment;

FIG. 4B illustrates a display which may guide a customer through the process flow of FIG. 4A;

DETAILED DESCRIPTION OF CERTAIN PREFERRED EMBODIMENTS

By way of overview and introduction, the present invention is described in detail herein in connection with a videotape retail establishment in which videotapes (the items) are rented or sold from a catalog of videotapes. This is the presently preferred application; however, the invention has utility in other environments such as registries, the detailed description being illustrative of merely one application of the technology.

1. Description Of The Hardware That May Be Used In The Preferred Embodiment

Figure 1:
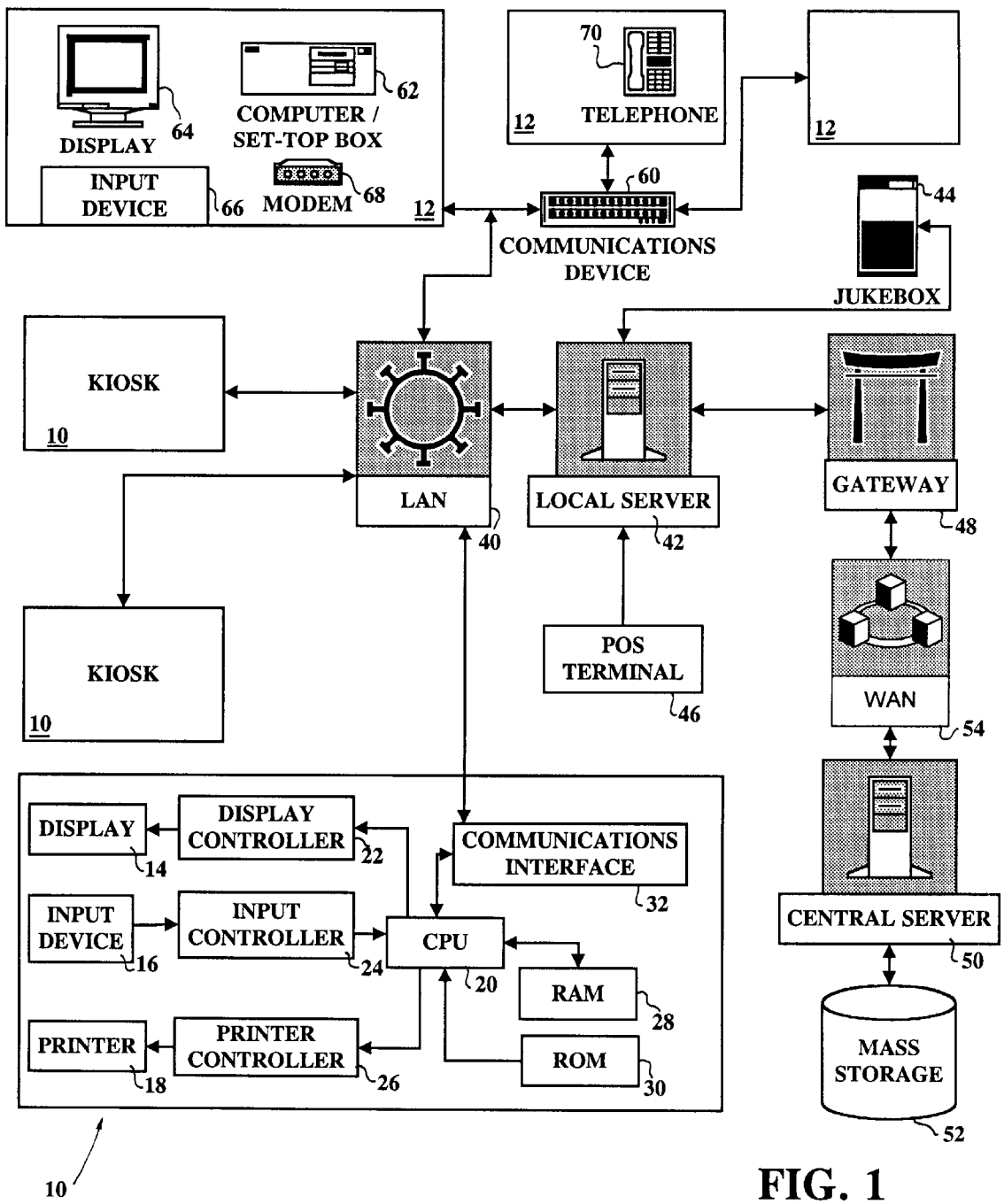
FIG. 1 illustrates a computer network including stations which may be used to implement the method according to the present invention.

FIG. 1 illustrates plural stations 10, 12 interconnected through a local area network 40. The station 10 is preferably arranged in the form of a kiosk for placement within a retail store. Each station 10 includes a display 14 on which catalog information is displayed. Each station 10 includes an input device 16 (for example, a keyboard, touch screen, or microphone) to allow customers to enter commands and information into the system, and optionally includes a printer 18 for printing information such as a customer's selections (and perhaps his or her reservations, described below). Each station 10 also has a central processing unit (CPU) 20 connected to the screen 14, input device 16, and printer 18 through respective controllers 22, 24, 26. The CPU 20 is additionally connected to a random access memory (RAM) 28 which includes registers for managing information at the station 10, and, in the embodiment of FIG. 1, a read only memory (ROM) 30 which may include program information for implementing the method of the present invention. Because station 10 may be part of a network, memory intensive data such as the catalog data (which represents the items in a catalog) and any trailers need not be stored within the station 10. Instead, each station 10 may include a communications interface 32 having bidirectional data and address lines 33 to connect it to the local area network (LAN) 40 from which catalog and trailer data can be obtained.

The LAN 40 can support plural stations 10 and preferably includes a server 42 and a jukebox 44. The jukebox 44 may include a network card for connection directly to the LAN 40 (e.g., a token ring network) or may be connected to the server 42 (as shown). The server 42 maintains records concerning, for example, the quantity of each item in the catalog that is presently in stock and the identity of customers to whom (or for whose benefit) items have been rented or sold. The server 42 transmits to each station 10 any information requested by a customer. The server also may be connected to point of sale (POS) terminals 46, for example, by a communications interface 46, or the POS terminals 46 may be connected directly to the LAN 40. The server 42 also has a communications device 48 (e.g., a gateway) for connecting the server 42 to a wide area network (WAN) 54.

The WAN 54 has a central server 50 and a mass storage device 52 on which the catalog and transaction data concerning prior designations may be stored. A multiplicity of LANs 40 from an equal number of stores may be interconnected through the WAN 54 so that transaction information concerning a customer's selections can be exchanged among and accessed at multiple stores. Such information sharing can be among subscribers of the present method. Thus, for example, data on a variety of experiences (movies, restaurants, etc.) can be recorded and maintained, and such data utilized with several different electronic catalogs.

The LAN 40 may also include a communications device 60 for permitting remote stations 12 to communicate with the LAN 40 of a local retail store. The remote stations 12 may comprise a personal computer or other electronic device 62 situated where the customer is presently located (e.g., home, office, or automated machine). Each remote station 12 may have a display 64, an input device 66, and a communications module or modem 68 to permit the computer 62 to connect to the LAN 40. Alternatively, a remote station 12 may comprise a telephone 70 or other device capable of two-way communication so long as it has an input and output device (e.g., a keypad and speaker, respectively).

Preferably, the remote stations 12 are capable of electronic data communication at rates of 28,800 bps or faster, and more preferably, are adapted to use ISDN, cable, or fiber optic technologies. This permits trailers to be transmitted quickly, although this is not a necessary feature of the inventive method.

These components are readily available off-the-shelf, and may be implemented using conventional networked computers configured to run software that executes the process flows of FIGS. 2–6, described next, or by special purpose programmed or hardwired machines.

2. Description Of Operation Of The Preferred Embodiment

With reference now to FIGS. 2–6, the inventive method is described in connection with a station 10, 12 as described above. It is to be understood, however, that the inventive method could operate using a station having different (e.g., fewer) components and a different construction than that of the stations 10, 12; the description of the stations 10, 12 being illustrative and not restrictive of the type of station that can be used with the present method.

a. Description of An Attract Mode Process

Figure 2A:
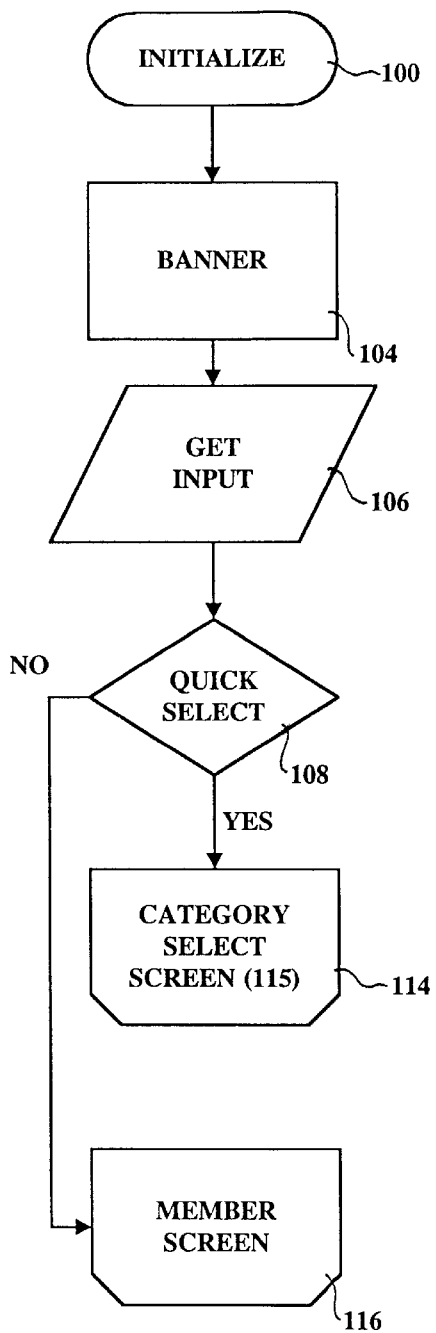
FIG. 2A illustrates a flow chart for permitting a customer to identify himself or someone else.
Figure 2B:
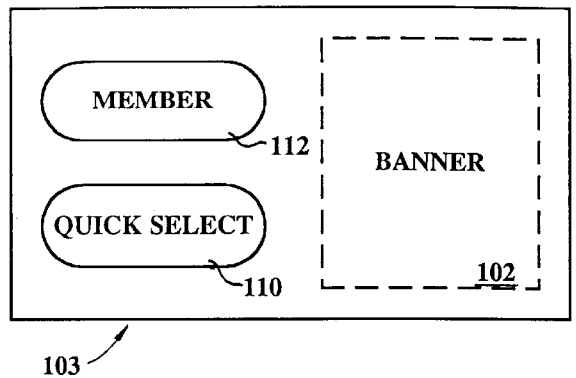
FIG. 2B illustrates a display which may guide a customer through the process flow of FIG. 2A.

At step 100 of FIG. 2A, the station 10, 12 is initialized. Initialization may include performing self-diagnostic tests, clearing internal registers, and checking communications ports and devices for incoming data. At step 104, a banner 102 is displayed on the display 14, 64 as part of an initial screen 103 (see FIG. 2B). The banner 102 may display, for example, the name and/or logo of the retail store, a special promotional offer, or highlight certain items in the store's catalog (for example, the most popular or perhaps older releases starring popular actors to spur sales of older releases). Preferably, the banner 102 cycles through a combination of displays to attract customers to the station until a customer enters data, at step 106 ("attract mode") Data entered using the input device 16, 66 is tested at step 108 to determine whether the customer desires to make a quick selection without user identification (via the "quick select" button 110 of FIG. 2B) or make a selection after user identification (via the "member" button 112, also in FIG. 2B). If the customer pressed the quick select button 110, the test at step 108 is satisfied and the program flow proceeds to step 114, which causes a category select screen 115 to be displayed (see FIG. 4B). On the other hand, if the customer has identified himself by pressing the member button 112, then the program flow proceeds to step 116, which causes a member screen to be displayed (not shown).

b. Description of A Customer Identification Process

Figure 3:
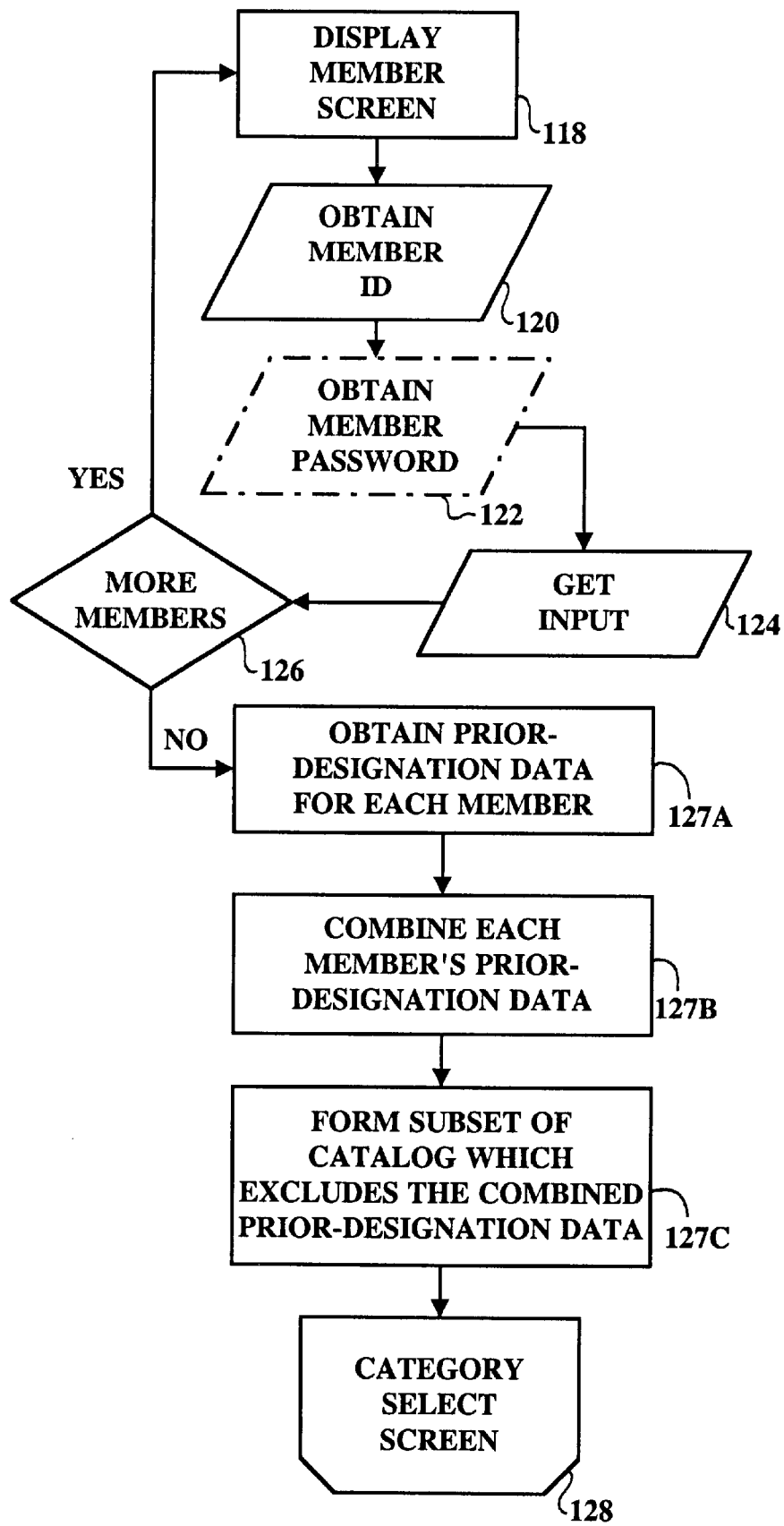
FIG. 3 illustrates a flow chart for obtaining the identity of one or more customers.

FIG. 3 illustrates the process flow for identifying one or more customers at the station 10, 12. This is the process flow that occurs after the customer has pressed the member button 112.

At step 118, the member screen prompts the customer for an identity and waits for a customer identification at step 120. (If no identification is received after a predetermined period of time, the display 14, 64 reverts attract mode, with the banner 102 being displayed as at step 104.) The customer may be identified at the station 10 by providing information in the form of a customer-identification signal at a keyboard or touch screen, by swiping an identification card, by voice or fingerprint recognition, or by other means which is capable of uniquely identifying a customer. Optionally, the member screen prompts the customer for a member password or personal identification number (PIN) to control access to the customer's account, which is entered at step 122 in any conventional manner, such as described above (step 120).

At step 124, the customer at the station 10, 12 inputs whether there are any other customers to identify. For example, a couple may identify each of themselves at a station by the first person entering his or her member identification at step 120, responding yes at the inquiry at step 124, as tested at step 126, at which point the process flow loops back to the member screen at step 118 so that the additional (e.g., second) customer's identification can be obtained (again at step 120). If there are no more customers to identify, as indicated by the response to the inquiry at step 124, the process flow proceeds toward step 128. This causes the category select screen to be displayed (see FIG. 4B).

In accordance with a salient aspect of the inventive method, associated with each customer is data representing his or her prior item designations. A prior item designation is an item that an identified customer has rented, purchased, attended, tried, used, or listed for purchase from a registry (as discussed below), and a designation generally refers to a customer's agreement to rent, purchase, attend, try or use an item from a catalog. Past or prior item designations can be stored on the customer's identification card which may include a magnetic stripe, a bar or dot-pattern code, an optically readable element, or RAM (flash, static, or dynamic), or may be stored locally at a particular retail store on the LAN 40 or centrally on the WAN 54. The prior item designations are compared against the catalog data to create a database subset which is used in the inventive method to effect the display of the items in the catalog or to effect a customer's ability to select items from the catalog, as described below in connection with FIGS. 5A and 5B.

At step 127A, the prior item designation-data of each customer identified at step 120 is obtained. The prior item designations of a particular customer may include designations which are not in the catalog of items of the system (e.g., LAN 40) to which a particular station 10, 12 is connected. For example, a local library and a local video store may each be licensed to use compatible systems, yet each may provide different items in their respective catalogs.

At step 127B, the prior designation-data obtained at step 127A is combined, for example, in a logical OR manner to create a list of each selection that has previously been designated by any of the identified customers. At step 127C, a database subset of the catalog is formed which excludes the prior designation-data of each of the identified customers.

The foregoing steps, which function to identify the prior designations of each of the identified customers, can be implemented in other ways to provide substantially the same result, namely, enabling one or more customers to select from among catalog items that he or they have not seen or experienced. It is to be understood that the order of the steps, combination of prior designation-data signals, and formation of lists are illustrative of one way of implementing the present invention; other ways would be deemed interchangeable by one of ordinary skill in the art. Further, the prior designation-data and subset of the catalog can be formed with regard to a partition of the catalog instead of the entire catalog. For example, the prior designation-data for comedy movies can be obtained and a subset of the comedies in the catalog can be formed which excludes the prior designation-data of each of the identified customers. This would occur, for example, if steps 127A, 127B, 127C are performed after selecting a category (see step 132 of FIG. 4A, and prior to the step of displaying the selections screen 133).

It should be understood that the process flow of FIG. 3 causes one or more customers to be identified prior to selecting a partition of the catalog, within which selections are displayed and identified customer's are enabled to make selections. Thus, regardless of whether the quick select button 110 or the member button 112 is pressed, the customer is always presented with the category select screen in the described embodiment. Depending on the application, however, it may or may not be necessary to partition the electronic catalog.

c. Description of A Catalog Partition Process

Because of the variety and existence of recognized categories of prerecorded movies, it is advantageous to partition the electronic catalog of videotapes into categories including one or more of the following types or genres: action, comedy, mystery, drama, western, war, horror, documentary, sports, musical, foreign, family, children, cartoon, and adult, as well as to instructional programs such as how-to and exercise formats and promotional programs. Each genre may be further categorized or cross-referenced to other genres for further partitioning of the catalog as indicated in the table below for some of the above-identified categories:

Comedy: Romantic, Teen, Slapstick

Drama: Romantic, Mystery

Sports: Football, Baseball, Horse racing

Foreign: French, Spanish, German, Japanese, Chinese

Other: Academy Award winner/nominee, performer

As new movie titles are made available on videotape, they may be placed in a separate or additional generic category known as "new releases."

Turning now to FIGS. 4A and 4B, the optional category select screen 115 is described.

At step 130, a selection of categories C1, C2, . . . , Cn is displayed. A special category Cs also may be displayed to accommodate the selections in private categories such as adult features. The customer makes a selection of a category at step 132 by inputting a partition signal which is then tested at steps 132-1, 132-2, . . . 132-n, and the selections within the category selected by the customer are then displayed on a selection display screen 133 at step 140.

Preferably, the station 10 includes a touch screen 14 so that a category C1, C2, . . . , Cn is selectable by simply touching its label (e.g., "drama") on the screen 14, although the customer's selection can be entered by other methods, such as by keyboard, mouse, or voice. One suitable supplier of touch screen devices and supporting control circuitry is Creston Electronics, Inc. of Los Alamitos, Calif.

If the tests at steps 132-1, 132-2, . . . 132-n fail, then category 132-s has been selected, and the process flow of FIG. 4A proceeds at step 134 by requesting the customer to enter a password, which may be entered (at step 136) in a conventional manner. (If the customer has previously been identified by fingerprint or voiceprint recognition, this step may not been needed.) If the password does not match the data for the identified customer, as tested at step 138, then the process flow returns to step 130 at which point the categories are again displayed and the customer is requested to select a category. Assuming that the password is correctly entered, the selection display screen 133 is displayed at step 140. (If the quick select button 110 had been pressed, the process flow proceeds directly from step 132-n (C-n Selected? NO) to step 140 because the customer is autonomous, and there is no privacy interest to safeguard.)

d. Description of An Item Selection Process

Figure 5A:
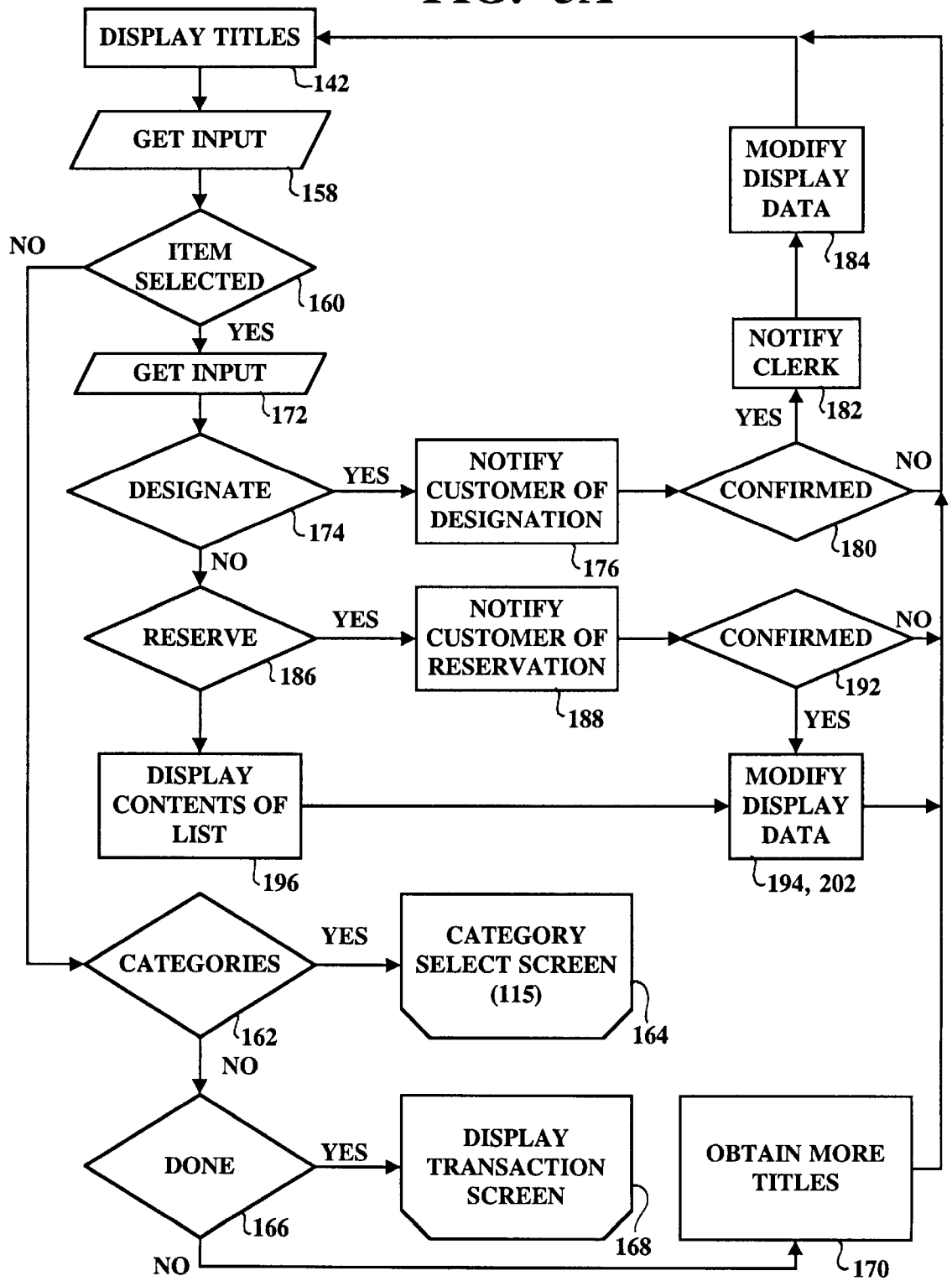
FIG. 5A illustrates a flow chart for enabling customers to designate, reserve, or "hold" items in the catalog.
Figure 5B:
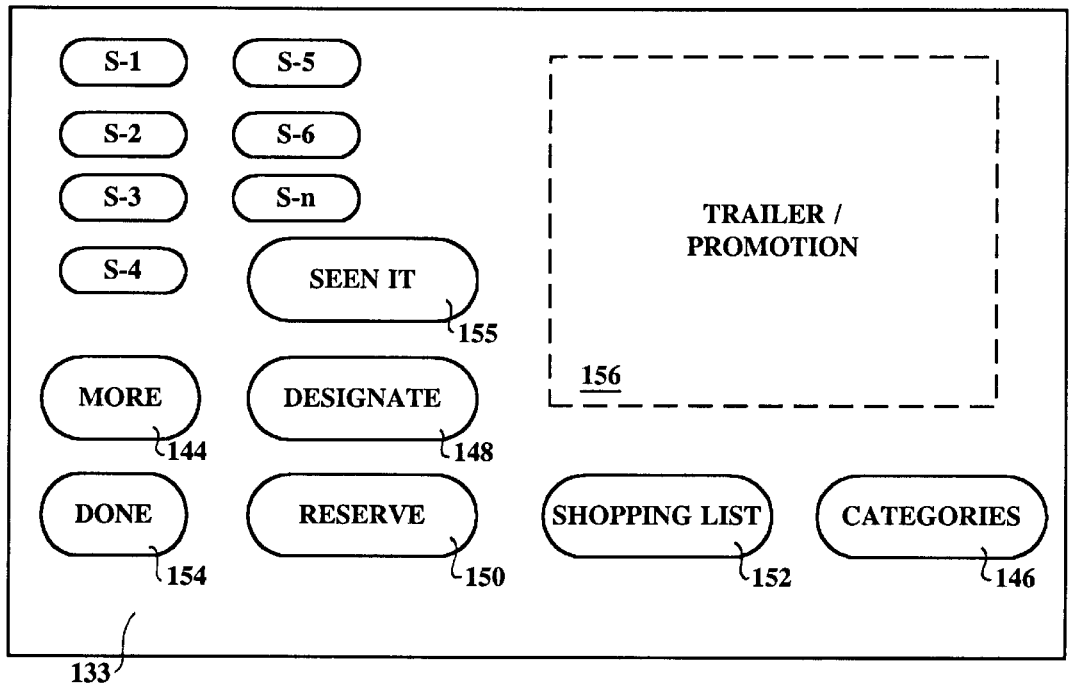
FIG. 5B illustrates a display which may accompany the process of FIG. 5A.

The selection display screen 133 is called up at step 142 of FIG. 5A in which a series of items are displayed as selections S1, S2, . . . , Sn (see FIG. 5B). Multiple selections S1, . . . , Sn can be displayed together on the selection display screen 133, or the selections can be serially displayed on successive selection display screens 133. The selection display screen 133 also provides the customer with several buttons to press including a more selections button 144 for displaying additional selections, a categories button 146 for switching to the category select screen to permit selection of a different category, a designate button 148 for indicating that the customer is renting or purchasing a particular selection for a fee, a reserve button 150 for indicating that the customer agrees to incur a nominal fee to reserve a particular selection for a period of time, a shopping list button 152 for creating a short list of preferred selections from the catalog without committing to renting or purchasing such selections and without incurring any fee, and a done button 154 for indicating that the customer is done selecting items from the catalog. In addition, the selection display screen 133 preferably includes a trailer box 156 in which a trailer, information regarding a particular selection (e.g., stars, awards, running time, synopsis), or promotional or store name/logo information can be displayed.

Upon reviewing the information on the selection display screen 133, at step 158, the customer is enabled to select from among S1, S2, . . . , Sn or can press one of the "more" selections, "categories," or "done" buttons 144, 146, 154, respectively. (The designate, reserve, and shopping list buttons 148, 150, 152, respectively, are only enabled (or displayed) if a selection S1, S2, . . . , Sn has been made.) Thus, at step 160, a test is first made to determine whether an item has been selected (e.g. "The Wizard Of Oz"). A customer is enabled to make a selection of certain catalog items in the database subset which have not been previously designated via the designate and reserve buttons, while other items from the catalog which previously have been designated may be displayed without being directly enabled for designation, selection, or reservation. In other words, the prior designations of a customer contained in the database subset formed at step 127C (FIG. 3) may influence the customer's present enablement to make a selection.

Where a touch screen is used, an item may be selected by touching the name or icon for the particular selection S1, S2, . . . , Sn desired. Alternatively, a mouse can be used to select the desired item from the screen, using conventional hypertext links. If an item has not been selected, the test at step 160 failed (Item Selection? No), and the process flow proceeds to the bottom portion of FIG. 5A with a test at step 162 to determine whether the customer desires to return to the category select screen 115. If the customer desires to select another category, the program goes to step 164 and calls up the category select subroutine at step 130 and proceeds from there. On the other hand, if the data entered at step 158 is neither an item selection nor a request for a different category, then a test is made at step 166 to determine whether the customer is done making selections, and, if so, the program proceeds at step 168 by calling up a transaction screen for finalizing the customer's transaction using the subroutine of FIG. 6. Otherwise, the customer has pressed the more button 144 which causes the program to obtain additional titles S1', S2', . . . , Sn' at step 170, and then loop back to step 142 to thereby display the additional titles along with the buttons 144 through 154.

Additional buttons can be provided. For example, a "seen it" button 155 can be provided to enable a customer to indicate that a particular catalog item has been seen (or experienced, tried, purchased, used, etc.). Such a button would cause the database of the customer's prior designation-data to be modified to include this new information, and would cause a modification of the display as at step 184 and a re-display of the item titles as at step 142. Such a button can be included at the station 10, 12, at an automated system (e.g., an interactive software/hardware driven program for use with telephones), or at the location where the selection is viewed or experienced (e.g., at the movie theater or bridal registry). The button enables the customer to indicate that he or she has experienced an item (e.g., movie) before it is available in a catalog (e.g., before the movie is included in a rental establishment's catalog of movies). If more than one customer has been identified, the system would inquire which customer has seen the movie.

If a selection S1, S2, . . . , Sn has been made at step 160, then the program proceeds to steps 172 through 202. In this case, the designate, reserve, and shopping list buttons 148, 150, 152, respectively, are enabled. Preferably, the display of these buttons changes to indicate to the customer that one of these operations can now be performed. For example, they change from a faded, inoperative mode to a high-contrast, operative mode. At step 172, the customer can choose to either designate the selected item, reserve the selected item, or include the selected item on his or her personal shopping list. The particular button pressed by the customer at step 172 is tested at steps 174 and 186. In the preferred embodiment, the catalog is examined to determine whether there is a non-zero number of the customer's selection available in a stock prior to enabling the designate, reserve, and shopping list buttons 148, 150, 152, respectively.

If the test at step 174 determines that the designate button 148 has been pressed, an alert box notifies the customer at step 176 that a designation has been made to rent or purchase the selected item. The customer confirms the designation, as tested at step 180. Assuming that the customer has confirmed the designation, the store clerk may be notified of the transaction at step 182 so that the item can be brought to the register (or placed in a delivery queue). The display of the selections S1, S2, . . . , Sn is modified at step 184 to account for the designation made at step 172, and so are the inventory records (the number in stock) and each identified customer's prior designation-data. The process flow then proceeds again at step 142.

The display of selections S1, S2, . . . , Sn may be modified in one of several ways, but always to distinguish the past designations of the customer from the remaining items in the catalog. Thus, the display of already-seen movies in a retail video rental establishment may be in red characters whereas the display of other catalog items may be in blue. This convention has enjoyed popularity on the internet. Alternatively, already-seen movies can be displayed with reduced contrast (e.g., faded or blurred) as compared to other items in the catalog. Yet another alternative may cause the arrangement of items to be altered, for example, to place already-seen movies in one column and the remaining movies in another column, or to display already-seen movies with additional information such as an asterisk. Yet another manner of distinguishing past designations of a customer from the remaining items in the catalog is to initially display all movie titles in the same way, yet provide an alert to the customer when an already-seen movie is designated. Another, less preferred, method is to not display movies that have been already-seen, or only permit the customer to designate movies which have not yet been seen. These latter methods are less preferred because they limit a customer's options.

If the test at step 174 determines that the designate button 148 has not been pressed, then a test is made at step 186 to determine whether the reserve button 150 has been pressed. Assuming that the test at step 186 determines that the reserve button 150 has been pressed, an alert box notifies the customer at step 188 that a reservation has been made to hold the selected item for a limited time (e.g., until some other item is designated or until the customer is at a POS terminal 46) or a predetermined period of time. The customer confirms the reservation, as tested at step 192. Assuming that the customer has confirmed the reservation, the store clerk may be notified of the reservation so that the item can be brought to the register (or placed in the delivery queue) as at step 182.

In any event, at step 194, the display of the selections S1, S2, . . . , Sn is modified to account for the reservation made at step 172, the number of items in stock of the type reserved is reduced by one, and reservation data is associated with one or all of the identified customers at the station where the reservation was made. Each reservation data entry may cause one or more of the identified customers to incur a monetary fee, for example, twenty-five cents. The process flow then proceeds at step 142, again. If reservation data has been associated with an identified customer for more than a set interval of time, for example, thirty minutes, then the reservation data may be disassociated with the identified customer, after a suitable warning that the customer is taking too long to shop.

If the tests at steps 174 and 186 determine that neither the designate button 148 nor the reserve button 150 has been pressed, then the shopping list button 152 must have been pressed, as determined by deduction. At step 196, the selection is added to any other items that may already be in the shopping list, and the contents of the list are displayed at the station 10, 12. The shopping list may be displayed until the customer indicates that he or she is ready to continue shopping (i.e., the program may loop until instructed by the customer to continue. At step 202, the display of the selections S1, S2, . . . , Sn is modified to account for the shopping list selection made at step 172. The process flow again proceeds at step 142 by waiting for the next action of the customer, which may be a selection from the remaining items S1, S2, . . . , Sn, or a press of the "more selections," "categories," or "done" buttons 144, 146, 154, respectively.

Figure 6:
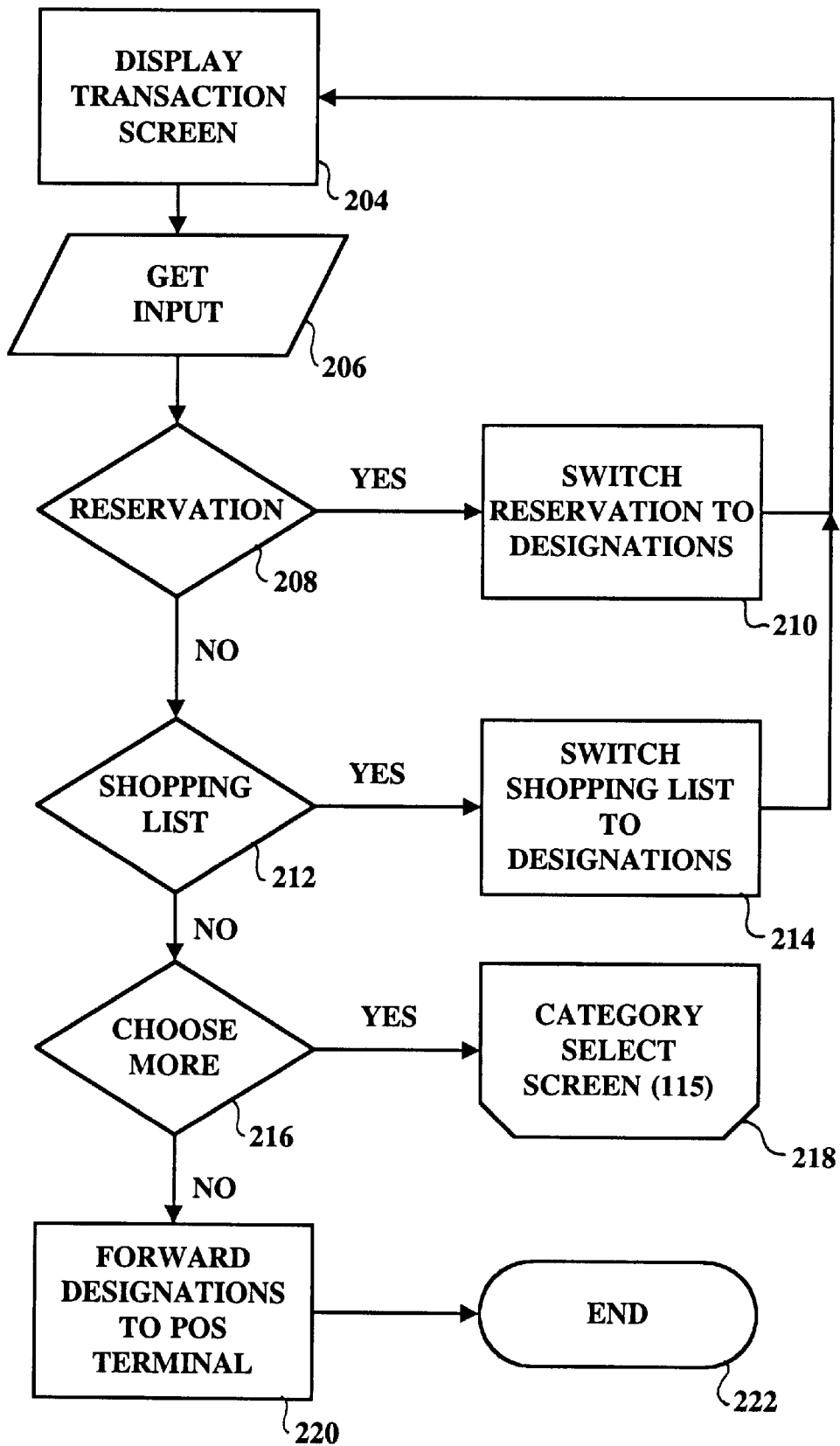
FIG. 6 illustrates a flow chart for completing a rental or sales transaction.

Upon pressing the done button 146, as determined at step 166, the process flow proceeds to step 168 by calling up a transaction screen from the transaction subroutine which finalizes the customer's transaction (see step 204 of FIG. 6).

e. Description of A Selection Review Process

The transaction screen (not shown) displays any designations, reservations, and shopping list selections that may have been made during the customer's session at the station 10, 12.

At step 206, the customer either designates selections for rental or purchase from the reservation or shopping list, returns to the category select screen 115 to select more items, or completes the transaction. At step 208, the customer's action is tested to determine whether the customer desires to designate one of his or her reservations. If so, the reserved item is moved or switched to the designations list at step 210, and the reservations list is modified to reflect this change, and the reservation data associated with one or more of the identified customers at the station is disassociated (that is, the item is again available to other customers), and the number of the item in stock of each item for which the reservation data was disassociated is incremented by one. The program flow then returns to step 204.

Otherwise, at step 212, the customer's action is tested to determine whether the customer desires to designate one of his or her shopping list items. If so, the shopping list item is moved or switched to the designations list at step 214, and the shopping list is modified to reflect this change. The program flow again returns to step 204 for further action by the customer.

If the customer does not desire to designate selections from among the reservations or shopping list items, then at step 216 the customer's action is tested to determine whether he or she desires to continue shopping. If so, then at step 218 the category select screen 115 is again called up and the program flow proceeds at step 130 (FIG. 4A). (Alternatively, the selection display screen 133 could be called up if the catalog is not partitioned.)

Otherwise, by default, the customer is done and, at step 220, the transactions for the customer during the entire session are recorded and/or forwarded to the POS terminal 46 for payment or the like. The process flow for this session terminates at step 222. (If the customer had pressed the quick select button 110 from the main screen, then only the shopping list would be displayed and/or printed at step 204, and program flow would advance directly to step 222.) Any reservation data associated with one or more of the identified customers at the station is disassociated, and the number of the item in stock of each item for which the reservation data was disassociated is incremented by one.

Each customer's designation-data is communicated from a station 10, 12 onto the LAN 40. The designation-data may be further communicated to the WAN 54. Designation-data may be obtained and stored on a member identification card, or on a central or local server, and such data may include multiple types of catalogs, e.g., movie, restaurant, theater, etc.

3. Description Of The Data Records Of The Preferred Embodiment

Figure 7:
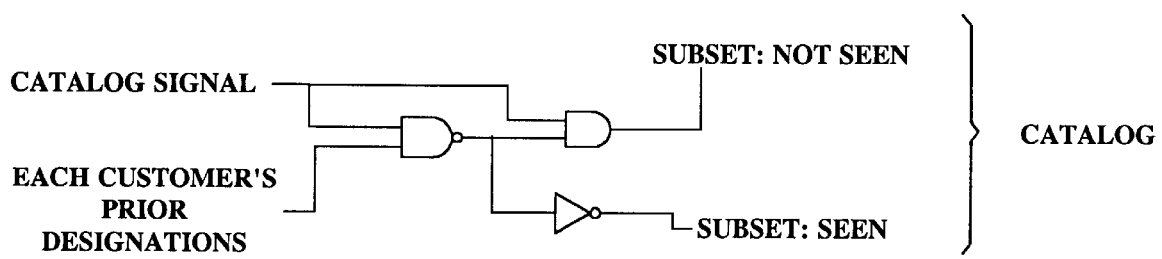
FIG. 7 schematically illustrates an arrangement of logic gates in accordance with an aspect of the invention.

A data record for each item in the catalog may include searchable and displayable data. In the context of the video retail store, each data record may include the category of the movie, its title, actors, director, awards, nominations, reviews, running time, year, clip address. The clip address preferably stores the location at which a trailer is stored. The clip address may be used to access the trailer and display it to a customer at the station.

Where a catalog consists of an ordered arrangement of uniquely identified items, it can be divided into two subsets: those selections that have not been seen and those that have been seen, as shown in FIG. 7. Such a subset of present selections (Present-S) can be formed by performing a logical NAND operation on the catalog of items C and on each customer's prior-designations (Prior-D), and then logically ANDing the NAND output with the catalog C, as shown in the truth table below.

| C | Prior-D | NAND | Present-S |
|---|---------|------|-----------|
| 0 | 0 | 1 | 0 |
| 0 | 1 | 1 | 0 |
| 1 | 0 | 1 | 1 |
| 1 | 1 | 0 | 0 |

In the context of a registry, each data record for the registered items may include the item-type (e.g., china, barware, stemware, or flatware), manufacturer, style (e.g., highball or lowball, five-piece place setting or soup bowl, etc.), number of such items still needed, and price.

4. Modifications And Additional Applications

Apart from the foregoing detailed description of a preferred embodiment, the concept of the invention may be applied with equal advantage to the selection of, for example, items from a library catalog, performances at theaters and cinemas, and restaurants. In the case of restaurants, for example, categories may be created based on the type of cuisine, location of the restaurant, its popularity, ambiance, or price. Further, the invention can be applied to services available on public networks such as the internet and the world wide web. In particular, online restaurant and movie guides may be accessible by one or more customers from their respective homes, or at designated locations, to make designations from the items available (e.g., available seating) in the electronic catalog.

Figure 8:
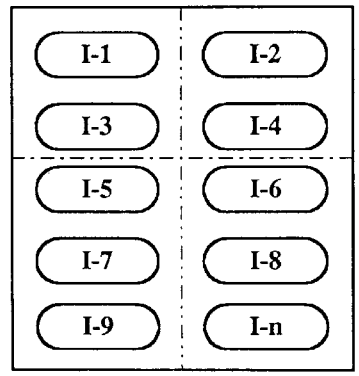
FIG. 8 schematically illustrates an inventory of items divided into partitions in accordance with another embodiment of the invention.

The invention may be used in connection with a store registry (e.g., a bridal or toy registry). In such an application, a person selects a partition of the store's inventory which is associated with a particular registry, that is, a list of items for which a customer has registered. A first customer's list of registered items P1 might partially or wholly overlap a different customer's registry P2, or may represent an entirely different partition of the store's inventory, for example, P3. FIG. 8 illustrates a catalog of items I1, I2, . . . , In which is illustrated having three partitions P1, P2, and P3 representing the registries of three different couples. The first registry P1 includes items I1, I3, I5, and I7; the second registry P2 includes items I1, I2, I3, and I4; and the third registry P3 includes items I2, I4, I6, I8. The catalog includes many other items through IN which may not be included in any of a plurality of registries PN that have been commonly partitioned from the same catalog. A person can access the store's registry either at the store station 10 or remotely by an electronic connection from a station 12. The person then identifies himself or herself as at step 120 (see FIG. 3) by inputting a person-identification signal, identifies the customer for whom a designation is to be made (see FIG. 4), and is presented with the identified customer's registry. Those items which already have been purchased will be excluded from the subset of items from which a present selection can be made. Because the person has been identified, he or she may be charged for any item that is designated. Preferably, the system also obtains credit, bank, or debit card information for charging an account of the identified person.

Because the process flow of FIGS. 2–6 pertains to the preferred application, some variation is required to implement other applications, such as a registry. For example, and as described above, steps 127A–C would be performed in the registry application after a particular customer's registry has been identified, that is, after step 132 and before step 133. Also, the categories or individual registries need not be displayed at step 130; instead, the person at the station 10, 12 first may be prompted to identify the particular customer whose registry is to be displayed.

Thus, the catalog data in a registry would be partitioned into at least one registry, and that registry would be associated with a particular customer (or, for example, two customers: a bride and a groom). In the presently preferred embodiment of a video rental establishment, however, all of the catalog data may be associated with each identified customer, although certain customers such as children may have limited access to the catalog data. For example, the catalog data associated with a child's account may exclude certain genres such as adult, horror, and war.

Thus, from the foregoing detailed description of a preferred application and certain additional applications, it is to be understood that the principles of the invention apply to designations made within a retail store or from a remote location. The designations may be picked up, delivered, or made available to the customer (or his or her designee) at any location.

A customer can augment his or her past item designations to make the system aware of catalog items that are part of the customer's past designations. Preferably, this may be done whenever the customer is presented with such item. For example, the customer's designation-data may be modified upon purchasing a ticket at a cinema or upon purchasing a ticket using a telephone ticket purchase service. This may be accomplished by identifying the customer and either storing the designation-data on a customer's membership card, or by transmitting it to the LAN 40 or WAN 54. Alternatively, the customer can modify his or her designation-data at a station 10, 12 by manually indicating that he or she has already seen a new release after it has been added to the catalog of movies. This can also be done at home or elsewhere using a station 12. The modified information can be uploaded to the LAN 40 or WAN 54, or stored on a user's membership or similar card for later uploading or permanently.

A corollary advantage of the invention is that by allowing the customer to manually modify his or her past designations, demographic data can be gathered.

Also, the inventive method has utility as a marketing tool to encourage the rental, purchase, use, attendance, or trying of certain activities. For example, a customer might receive a promotional incentive for attending a particular theater a predetermined number of times in a set period of time, and the incentive can be applied at a variety of stores that make use of the designation-data.

While the invention has been described in detail with particular reference to a preferred embodiment thereof, the invention is capable of other and different embodiments, and its details are capable of modifications in various obvious respects. As would be readily apparent to those skilled in the art, variations and modifications can be affected while remaining within the spirit and scope of the invention. Accordingly, the foregoing disclosure, description, and Figures are for illustrative purposes only, and do not in any way limit the invention, which is defined only by the claims.

We claim:

1. A method for enabling a designation of items from a store's catalog, the store's catalog being made available at a station in an automated system, comprising the steps of:
   a. identifying at least a first customer at the station from an input customer-identification signal;
   b. obtaining catalog data associated with the identified customer including items from the store's catalog;
   c. obtaining designation-data associated with each identified customer which represents the prior designations of items for each identified customer;
   d. defining a database subset of the catalog data using the designation-data, wherein the database subset is restricted to those items in the store's catalog that are not among the items in the designation-data associated with each identified customer;
   e. guiding present selections by enabling an electronic designation of an item at the station from at least the items in the database subset; and
   f. electronically modifying the designation-data associated with each identified customer to include any item designated at the station, such that a subsequent step of obtaining designation-data will obtain said modified designation-data,
   whereby any subsequent selection is guided using a database subset defined by said modified designation-data.

2. The method as in claim 1, wherein all of the catalog data is associated with each identified customer.

3. The method as in claim 1, wherein the catalog data is partitioned into at least one registry which includes items associated with a particular customer.

4. The method as in claim 1, wherein the enabling step includes displaying at least a portion of the database subset along with at least a portion of the designation data at the station, and including the additional step of:
   differentiating the display of the database subset from the display of the designation data.

5. The method as in claim 1, including the additional steps of:
   identifying a person at the station from an input person-identification signal; and
   charging an account of the identified person for any item designated at the station.

6. The method as in claim 1, wherein the step of defining a database subset occurs electronically after the designation-data is obtained.

7. The method as in claim 1, wherein the step of defining a database subset includes the steps selected from the group of:
   electronically comparing the catalog data with the designation data to identify the data elements in the catalog data that are not included in the designation data, and electronically including the identified data elements in the database subset; and
   electronically comparing the catalog data with the designation data to identify the common data elements among each, and electronically excluding the identified common data elements from the database subset.

8. The method as in claim 1, wherein plural store catalogs are made available at the station and wherein the catalog data includes items from the plural store catalogs.

9. A method for presenting a selection of items from a store's catalog, the store's catalog being made available at a station in an automated system as catalog data, comprising the steps of:
   a. identifying at least a first customer at the station from an input customer-identification signal;
   b. obtaining designation-data associated with each identified customer which represents the prior designations of items by each identified customer;
   c. creating a database subset of the catalog data by excluding the designation-data, wherein the database subset is restricted to those items in the store's catalog that are not among the items in the designation-data associated with each identified customer; and
   d. displaying at least a portion of the database subset on a display device at the station to thereby guide a present selection of an item from the database subset.

10. The method as in claim 9, including the additional step of:
   enabling an electronic selection of an item at the station from at least the items in the database subset.

11. The method as in claim 10, wherein the displaying step also displays at least a portion of the designation data and the enabling step enables an electronic selection of an item from the displayed items.

12. The method as in claim 9, including the additional step of:
   differentiating the display of the database subset from the display of a remainder of the catalog data.

13. The method as in claim 9, wherein the identifying step further includes the step of identifying a second customer from a separate input customer-identification signal, whereby the database subset that is created excludes the designation-data of at least the first and second identified customers.

14. The method as in claim 9, wherein the catalog data are associated with at least one partition of the catalog, and including the additional steps of:
   obtaining a desired partition at the station from an input partition signal associated with the identified customer; and
   displaying at least a portion of the items in the desired partition, including items within the database subset.

15. The method as in claim 14, including the additional step of:
   enabling an electronic selection of an item in the desired partition from at least the items in the database subset.

16. The method as in claim 9, wherein there is a predetermined number of each item available in a stock, and including the additional step of:
   enabling a reservation of a desired item from the catalog data by:
      1. associating reservation data representative of the desired item with each identified customer; and
      2. decrementing the predetermined number of the desired item in the stock.

17. The method as in claim 16, including the additional steps of:
   enabling a designation for rental or purchase of an item at the station from the items in the catalog data;
   decrementing the predetermined number of the designated item in the stock;
   disassociating any reservation data of the identified customer; and
   incrementing the predetermined number in the stock of each item for which reservation data was disassociated.

18. The method as in claim 17, including the additional step of:
   charging the identified customer for any disassociated reservations.

19. The method as in claim 16, including the additional steps of:
   disassociating any reservation data of the identified customer for which reservation data has existed beyond a predetermined period of time; and
   incrementing the predetermined number in the stock of each item for which reservation data was disassociated.

20. The method as in claim 9, wherein there is a predetermined number of each item available in a stock, and wherein the catalog data is associated with those items for which there is at least one in the stock.

21. The method as in claim 9, wherein the catalog is a movie catalog and items are movies.

22. The method as in claim 9, wherein the step of creating occurs electronically after the designaton-data is obtained.

23. The method as in claim 9, wherein plural store catalogs are made available at the station and wherein the catalog data includes items from the plural store catalogs.

24. An apparatus for presenting a selection of items from a catalog, the catalog being made available as catalog data, comprising:
   a. means for identifying a first customer at the station from an input customer-identification signal;
   b. means for obtaining designation-data associated with each identified customer using the customer-identification signal;
   c. means for creating a database subset of the catalog data which excludes the designation-data in response to the obtained designation data, wherein the database subset is restricted to those items in the catalog that are not among the items in the designation-data associated with each identified customer; and
   d. means for displaying at one time at least a portion of the database subset at the station to thereby guide a present selection of an item from the database subset.

25. The apparatus as in claim 24, wherein there is a predetermined number of each item available in a stock, further comprising:
   means for enabling a reservation of a desired item from the catalog data, including:
   means for determining when the predetermined number of the desired item in the stock is at least one;
   means for associating reservation data representative of the desired item with each identified customer; and
   means for decrementing the predetermined number of the desired item in the stock.

26. A method for displaying items in a catalog, the items in the catalog being made available at a station in an automated system as catalog data, comprising the steps of:
   a. identifying one or more customers at the station from respective input customer-identification signals;
   b. obtaining designation-data associated with each identified customer in response to each customer-identification signal, the designation-data including data elements which represent the prior designations of items by each identified customer;
   c. defining a database subset of the catalog data using the designation-data, wherein the database subset is restricted to those items in the catalog that are not among the items in the designation-data associated with each identified customer; and
   d. displaying at least the database subset at the station to thereby guide a present selection of an item from the database subset.

27. The method as in claim 26, wherein the step of defining the database subset comprises:
   electronically comparing the catalog data with the designation data to identify the data elements in the catalog data that are not included in the designation data; and
   electronically including the identified data elements in the database subset.

28. The method as in claim 26, wherein the step of defining the database subset comprises:
   electronically comparing the catalog data with the designation data and to identify the common data elements among each; and
   electronically excluding the identified common data elements from the database subset.

29. The method as in claim 26, wherein the displaying step includes the step of differentiating, on the display screen of the station, the display of data elements in the database subset from the simultaneous display of data elements that are not in the database subset.

30. The method as in claim 26, wherein the store is a computer accessible site.

31. The method as in claim 26, including the additional step of enabling, at the station, an electronic selection of an item in the catalog by each identified customer from at least the items in the database subset.

32. The method as in claim 26, wherein the step of obtaining designation-data includes obtaining designation-data stored on a card carried by each identified customer.

33. The method as in claim 32, including the further step of transferring to a network connected to the station designation-data that is stored on the card.

34. The method as in claim 26, wherein the station is communicatively connnected to a network, and wherein the data elements of the catalog are stored on the network and obtained by the station.

* * * * *